United States Patent Office 2,738,493
Patented Mar. 13, 1956

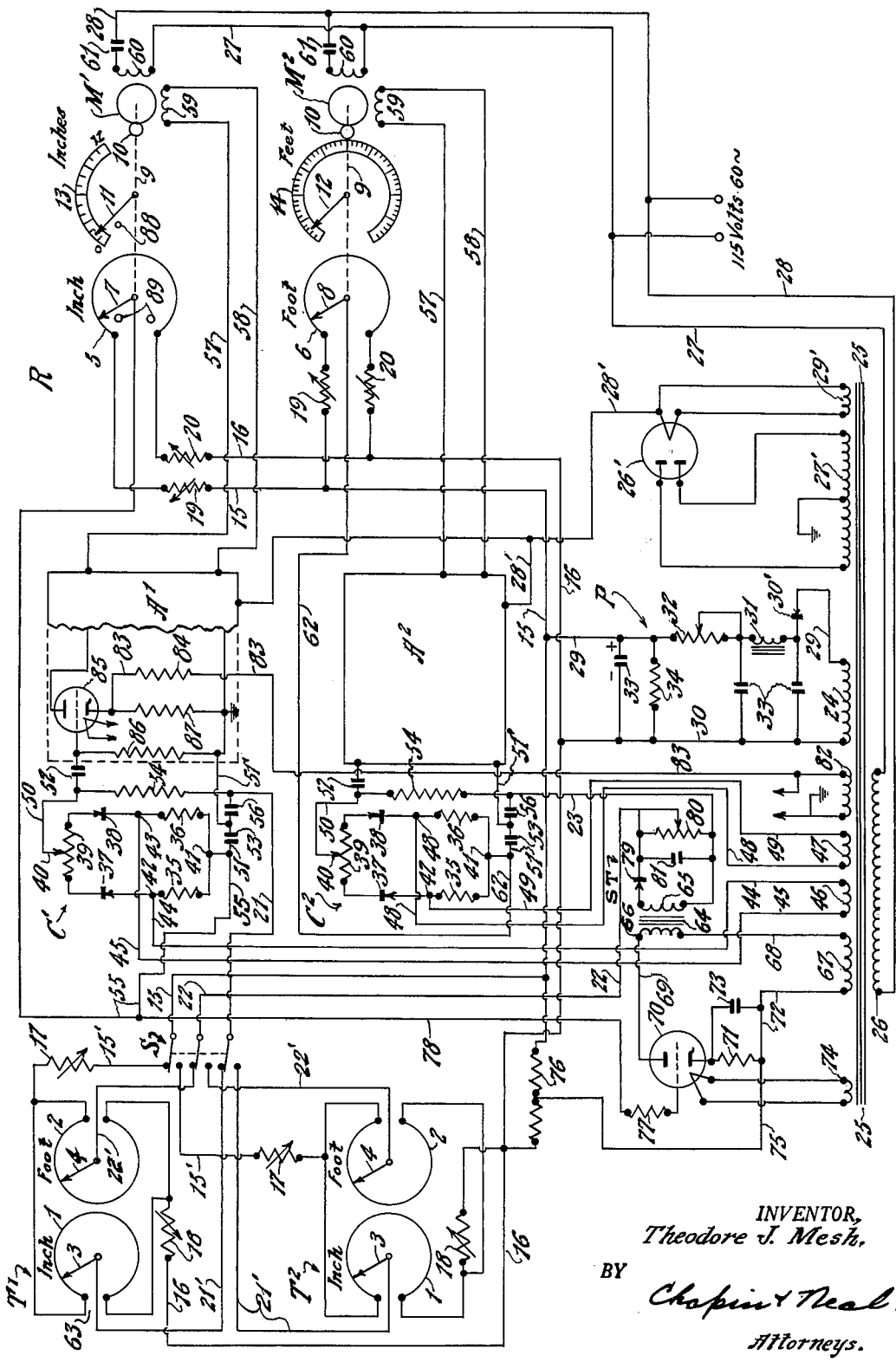

2,738,493

COARSE AND FINE FOLLOW-UP MEASURING SYSTEM

Theodore J. Mesh, Easthampton, Mass., assignor to Gilbert & Barker Manufacturing Company, West Springfield, Mass., a corporation of Massachusetts Application May 13, 1954, Serial No. 429,475

9 Claims. (Cl. 340—184)

This invention relates to improvements in telemetric systems.

More particularly, the invention is directed to an improved null-balance measuring system, having transmitters and receivers interconnected in a normally-balanced circuit network, which becomes unbalanced by minute variations in unidirectional voltage produced in the transmitter by variations in the condition being measured and which automatically rebalances by suitable means such as a reversible two-phase alternating-current servomotor, actuated in one direction or the other, depending on the direction of unbalance, by alternating-current voltages suitably converted from the unidirectional unbalance voltages and suitably amplified, the motor serving to move the indicator of a measuring instrument to show in suitable units the variations in the condition being measured.

The invention, while capable of general application, finds one advantageous use in the measurement of liquid level in a storage tank and in the indication of such measurement at a remote point. For example, in the petroleum industry, it is desired to be able to ascertain at one receiving station, the level of liquid in any one of a plurality of storage tanks, and this invention has been directed especially to the accomplishment of this work with precision and in a fool-proof manner, although it may be used for many other purposes, as will be readily understood by those skilled in the art.

The invention has for one object the provision in a measuring system of the class described of a means for automatically returning the indicator of a measuring instrument to its initial or zero position, whenever there is an interruption in the self-balancing circuit network, by means of a small but constant alternating-current signal introduced into the amplifier of the system and tending, when permitted by the absence of a larger and overpowering signal, to turn the indicator back to zero.

The foregoing provision, while not limited thereto, is especially useful in connection with the fractions measuring instrument used in a receiver which is adapted to be selectively connected by suitable switching means to a plurality of transmitters, as for one example, in the case of a "farm" of petroleum storage tanks. The fractions transmitter usually has a continuously rotatable slider. This slider can stop in the gap between the two ends of the potentiometer winding and thereby break the circuit network and prevent the receiving fractions potentiometer of the receiver from rebalancing at the proper level. Because of this it would be possible, under some conditions, for the measuring instrument to give a false indication, except for the provision which automatically restores the indicator to zero, whenever the circuit network is broken in the manner set forth.

Another object of the invention is the provision in a measuring system of the class described, wherein there are two measuring instruments, both actuated by the same variations in the condition being measured but at different rates, so that one shows units and the other fractions of units of such condition, of means controlled by and in proportion to the movement of the fractions indicator for opposing movement of the units indicator by its actuating force to maintain the units indicator stationary at one unit position, while the fractions indicator moves gradually from between zero and its full unit position. When the fractions indicator resets to zero the opposing force is released, allowing the units indicator to be suddenly moved one full unit from said one unit position to a next adjacent unit position.

These and other objects will best be understood from the detailed description of one illustrative embodiment of the invention in the accompanying drawing in which, The figure is an electrical diagram of a measuring apparatus embodying the invention.

In this drawing, the invention has been shown, by way of illustrative example, as embodied in a null-balance system for measuring the liquid level in any one of a plurality of storage tanks and for indicating such level at a remote location on suitable instruments, which may indicate or record the level in feet and inches, for example. This adaptation of the invention is desirable for use in the petroleum industry to enable an operator at a receiving station, remote from a tank farm, to be able to readily ascertain the level of liquid in any one of the large number of storage tanks, which usually comprise such a farm. While this invention is desirable for this particular use, it is nevertheless adapted for many other uses, wherever the condition to be measured is to be expressed in units and fractions thereof, as will readily be understood by those skilled in the art.

At each tank is a transmitting station, such as $T^1$ and $T^2$, and at each such station are a pair of transmitters. Each such pair may for example consist of two precision potentiometers 1 and 2, the movable elements 3 and 4 of which are actuated by variations in the level of liquid in the tank. In this case the potentiometer 1 has a circular resistance winding and its movable element 3 will be rotated one complete revolution by a twelve-inch variation in level of liquid in the tank. The potentiometer 2 has an helical resistance winding and its movable element 4 will traverse its range (ten revolutions) by a variation in level equal to the total depth of liquid that the tank will hold, say for example, 50 feet. Either pair of these transmitters may be connected by a switch S, usually snap-acting and operated in any suitable way and preferably from the receiving station R to a pair of receivers consisting of precision potentiometers 5 and 6. The movable elements 7 and 8 of the potentiometers 5 and 6 are respectively actuated by suitable servo-motors $M^1$ and $M^2$ through the intermediary of a suitable transmission 9 which includes reduction gearing 10, and which is herein indicated merely in conventional form. The servo-motors in this example are 115 volt, two-phase alternating-current induction motors having a synchronous speed of 3600 R. P. M., which is reduced by gearing 10 to 8 R. P. M. The two inch potentiometers 1 and 5 and the two foot potentiometers 2 and 6 are included in a measuring circuit network of the null-balance type, whereby the movement of the movable element 3 or 4 will unbalance the particular circuit network that it controls. The unbalance signal, which is a small microampere D. C. current or milli-volt D. C. voltage, is converted in a suitable converter $C^1$ or $C^2$, as the case may be, into phase-sensitive alternating-current that is amplified by a suitable electronic amplifier $A^1$ or $A^2$, as the case may be, and transmitted to the motors $M^1$ or $M^2$, which move the elements 7 or 8, respectively, to rebalance the respective systems. The measurements are shown by indicators such for example as pointers 11 and 12, which may be driven from the shafts of elements 7 and 8, respectively, and show on scales 13 and 14 the measurement in inches and feet respectively.

Broadly considered, each receiver includes a measurement indicator movable by electrical means, which include the servo-motor, receiving potentiometer, amplifier and converter and which is actuated by a variation in voltage produced by the transmitter. The converter constitutes an input portion of such electrical means, receiving the unbalance voltage from the transmitting potentiometer.

All the potentiometers described are energized from a suitable power source, usually located at the receiving station, such source supplying direct current by way of line wires 15 and 16, which are respectively connected to the positive and negative terminals of the potentiometers. The line wire 16 connects with the negative terminals of all the potentiometers at all the tanks, whereas the line wire 15 may be selectively connected by switch S to various line wire extensions 15', which extend one to each tank and connect with the positive terminals of both transmitting potentiometers. At each transmitting station, line-balancing variable resistors 17 and 18 are respectively interposed between the line wires 15' and 16 and the positive and negative terminals of the potentiometers. The inch and foot transmitting potentiometers are connected in parallel and one set of variable resistors 17 and 18 suffices for both. The receiving potentiometers 5 and 6 have individual line-balancing variable-resistors 19 and 20, respectively. The various line-balancing resistors are adjusted so that the potential across the positive and negative terminals of each potentiometer is exactly the same. The movable elements, or sliders 3 and 4, of the transmitting potentiometers are connected through the converters $C^1$ and $C^2$ to the movable elements 7 and 8, respectively, of the receiving potentiometers 5 and 6. When the element 3 is in the same position as element 7 and the element 4 is in the same position as element 8, no current will flow in the connection between the elements 4 and 8. Each element 3 is connected by a wire 21' to a terminal of switch S and each element 4 is connected by a wire 22' to another terminal of switch S. This switch can connect any pair of wires 21' and 22' to wires 21 and 22, respectively, which lead to the converter $C^1$ and a footstepping means ST, respectively, such means being connected by a wire 23 to the converter $C^2$, as will later be described in detail.

The direct-current power source for the potentiometers may be of any suitable kind. There has been shown herein a power source P, which supplies a direct-current potential of 80 volts to the line wires 15 and 16. This source P includes the secondary 24 of a transformer 25, the primary 26 of which is connected by line wires 27 and 28 to a suitable source of alternating current, in this case of 115 volts and 60 cycles frequency. The secondary 24 is connected to line wires 15 and 16 by wires 29 and 30, the wire 29 having interposed therein a rectifier 30', a choke coil 31 and a variable resistor 32 (herein of 200 ohms resistance). The wire 29 is connected at points on opposite sides of coil 31 and a point between resistor 32 and wire 15 to wire 30 by filter capacitors 33. Connecting the wire 30 to the wire 29 at a point between resistor 32 and the connection to the adjacent capacitor 33, is a resistor 34 (herein having a resistance of 2000 ohms). This power source rectifies alternating current at 120 volts and delivers direct current to the line wires 15 and 16 at 80 volts, the last named voltage being adjustable by the variable resistor 32.

Direct current for the amplifiers $A^1$ and $A^2$ is derived from a full-wave rectifier 26' supplied from a secondary 27' of transformer 25, which secondary has its mid point grounded and its terminals connected one to each of the plates of the rectifier. The cathode of the rectifier is connected by a wire 28' to both the amplifiers $A^1$ and $A^2$ and its filament is supplied with heating current from a secondary 29' of transformer 25.

The converters $C^1$ and $C^2$ may be of any suitable type. In the example herein shown, each converter comprises a bridge circuit having resistors 35, 36, 37 and 38, one in each branch of the bridge, and a variable resistor 39, the movable element 40 of which constitutes one output terminal of the bridge, the other output terminal being designated 41. The input terminals 42 and 43 of the bridge circuit are connected by wires 44 and 45 to a secondary 46 of transformer 25, herein supplying 60 cycle alternating-current at .8 volt. The converter $C^2$ has a separate supply at the same voltage and frequency from a secondary 47 of transformer 25 by way of wires 48 and 49. The resistors 35 and 36 are ordinary linear resistors of substantially equal resistance, in this case 33 ohms. The resistors 37 and 38, however, are non-linear resistors, which are semi-conductors exhibiting some degree of polarization and have the special characteristic that their ohmic resistance varies with the current flowing through them and with the direction of flow of the current. Germanium, selenium and silicon are examples of materials that have been found suitable. An ordinary dry type rectifier is suitable provided that it is operated at a voltage below that at which it will function efficiently as a rectifier because the rectifier does not function as a rectifier in the converter. Rather, it allows current to flow in both directions but to different degrees. The output terminals 40 and 41 of the bridge circuit are respectively connected by wires 50 and 51 and coupling capacitors 52 and 53 to the input terminals of the amplifier. The wire 21, which connects with the slider 3 of the transmitting inch potentiometer is connected through a loading resistor 54 to wire 50 and thus to output terminal 40 of the converter bridge. The slider 7 of the receiving inch potentiometer is connected by a wire 55 to wire 51 and thus to the output terminal 41. The wire 21 is also connected by a capacitor 56 to a grounded input wire 51' of the amplifier $A^1$.

It will thus be seen that the inch sliders 3 and 7 and the converter bridge $C^1$ are connected in series by the wires 21, 21' and 55. With no current flowing in this series connection the converter bridge $C^1$ is balanced by adjustment of the slider 40 until no A. C. voltage appears in its output circuit. A movement of the inch slider 3 of the transmitting inch potentiometer will unbalance the measuring system and a small voltage, of the order of milli-volts, will be applied across the output terminals of the converter bridge, causing a micro-ampere unidirectional current to flow through the bridge. The current will divide and flow part through one branch, which includes resistors 35 and 37, and part through the other branch which includes resistors 36 and 38. The arrow heads of the symbols for the non-linear resistors 37 and 38, indicate the direction in which the resistors are most conductive. It will be seen that direct current will flow through one non-linear resistor in its more conductive direction and through the other non-linear resistor in the less conductive direction. The resistance of one non-linear resistor will decrease and the resistance of the other will increase, causing a change in current through the bridge. The bridge becomes unbalanced and a 60-cycle alternating-current appears across the output terminals of the bridge. This current is either in phase or entirely out of phase with the line current depending on the polarity of the unbalance voltage. The small unbalance alternating-current signal is amplified to a suitable extent by an amplifier $A^1$, which may be of any suitable type well known in the art, and the amplified signal is transmitted by wires 57 and 58 to one winding 59 of the two-phase servo-motor $M^1$. The other winding 60 of motor $M^1$ is connected to the alternating-current supply wires 27 and 28. A suitable capacitor 61 is interposed in one of such wires to secure proper phase displacement. When the unbalance voltage is of one polarity, the motor $M^1$ will turn in one direction and when the unbalance voltage is of opposite polarity, the motor will turn in the opposite direction. When the measuring system is in balance there is no 60 cycle output current from the bridge and the motor remains stationary.

In the case of the transmitting foot potentiometer, the unbalance voltage is applied to converter $C^2$, changed into alternating current, which is amplified by an amplifier $A^2$ and transmitted to a motor $M^2$ to actuate the slider 8 and pointer 12 in the same general way as described in connection with the inch potentiometer, except that the pointer 12 and the slider 8 are moved step by step. The pointer 12 is moved by increments equal to the distance between two successive graduations on scale 14 and never comes to rest in an intermediate position. It is desired to have the pointer 12 remain stationary at a foot graduation, while the pointer 11 moves up or down between 0 and 12 inches. To accomplish this, is the purpose of the stepping arrangement ST, heretofore referred to as being interposed between the wire 22, which connects with the slider 4 of the transmitting foot potentiometer, and the wire 23, which connects with output terminal 40 of the converter bridge $C^2$. The other output terminal 41 of bridge $C^2$ is connected by a wire 62 with the slider 8 of the receiving foot potentiometer.

This stepping arrangement ST comprises means for producing in the series circuit that interconnects the sliders 4 and 8 of the transmitting and receiving foot potentiometers 2 and 6, a unidirectional voltage, which will equal and oppose the voltage produced by movement of the foot slider 4 and cancel it, so that no movement of the slider 8 or pointer 12 will result. The production of this bucking voltage is controlled from the slider 7 of the receiving inch potentiometer 5 and is directly proportional to the voltage produced as this slider moves from 0 to 12 inches or vice versa. Movement of the slider 8 and pointer 12 of the receiving foot potentiometer occurs only when the slider 3 passes from one end to the other of the resistance winding of the transmitting inch potentiometer 1. There is a small gap between such ends that has been shown conventionally and not its actual size, which is very small, a matter of about 2 degrees in angular extent. When the slider 3 passes from one end to the other of its winding the slider 7 rebalances and the indicator 11 is reset, moving to zero and causing the bucking voltage to drop to zero. Then the slider 8 and pointer 12 will be moved by the voltage derived from the foot potentiometer in one step such that the pointer is carried to the next foot graduation on the scale 14. The bucking voltage must be isolated from the potentiometer voltages although it must be controlled by and in proportion to the change of voltage produced by the movement of the slider of one of the inch potentiometers and preferably that of the receiving inch potentiometer.

In order to effect isolation of the bucking voltage, a transformer 64 is utilized and the bucking voltage is produced in the secondary 65 and a circuit, connected thereto, as will be later described. The primary 66 of transformer 64 is supplied with current, in this case at 120 volts, 60 cycles, from a secondary 67 of the power supply transformer 25. The primary 66 is included in a series circuit comprising the wire 68, secondary 67, a wire 72, load resistor 71 (in this case of 100,000 ohms resistance), triode 70 and a wire 69. The primary 66, while shown connected to the plate of triode 70, could equally well be in the cathode side with resistor 71. The latter is by-passed by a capacitor 73. The heater of this triode is supplied with 6.3 volts from a secondary 74 of transformer 25. Grid bias is secured by way of a wire 75, which connects with a tap of a voltage divider 76. The latter is connected across the direct current supply wires 15 and 16, and said tap, in this case, is 20 volts above the negative power supply terminal. The grid of triode 70 is connected through a resistor 77 and a wire 78 to the wire 55 and thus to the slider 7 of the receiving inch potentiometer. The secondary 65 is connected in series with a rectifier 79 and a variable resistor 80 which in this example has a resistance of 1000 ohms. The wire 22 from the slider 4 which is the positive output terminal of the transmitting foot potentiometer is connected to the positive terminal, which in this case, is the movable contact of the variable resistor 80. The negative terminal of resistor 80 is connected to the wire 23, which, as above described, connects with the converter $C^2$ and through the latter and wire 62 with the slider 8 of the receiving foot potentiometer 6. The voltage produced in the circuit of the secondary 65 is rectified by rectifier 79 and its pulsations are smoothed out by an electrolytic capacitor 81. A part of this voltage, in this case about a third, is applied in the circuit between the sliders 4 and 8 in opposition to the voltage derived from the transmitting foot potentiometer 2.

The circuit associated with triode 70 is basically a form of "cathode follower," which has characteristics making it suitable for the particular work here involved. Specifically, the circuit is highly degenerative and thus has a high degree of negative feed back. This makes for excellent linearity, so that the output voltage is very closely proportional to the input voltage. Therefore, the circuit is independent of tube aging or differences between individual tubes. While there is an actual loss in voltage (the output voltage being about 95% of the input voltage), there is a gain in power because the input impedance becomes so high that no appreciable power is drawn from the input source. Loss of voltage is not important since a maximum of only about 1.5 volts is required for the bucking voltage. This circuit permits the use of input voltages as high as 75 volts while retaining good output proportionality. These are the usual attributes of cathode follower circuits. As differentiated from the conventional cathode-follower circuits, the present one is supplied with alternating-plate voltage of 120 volts and the triode operates in self-rectifying fashion. The output voltage is in series with the input voltage and bucking it. The circuit operates to cause a direct-current voltage to appear across the cathode resistor 71 which voltage is practically the same as that across the input. The input voltage to the cathode follower is taken between the slider of the receiving inch potentiometer and the tap in the voltage divider 76 and in this case, varies from approximately $-20$ to $+55$ volts. The maximum bucking voltage required is only about 1.5 volts, assuming the foot transmitting potentiometer voltage to vary from 0 to 75 volts with a variation of from 0 to 50 feet in the depth of liquid in the tank. The necessary reduction in voltage to from 0 to 1.5 is effected with the step down transformer 64 (having a 5 to 1 ratio) and the variable resistor 80, which is adjusted to exactly the proper voltage. That is, the bucking voltage produced will vary from 0 to the maximum as the voltage of the transmitting foot potentiometer varies, when moved by a one foot difference in level. The input voltage varying as above set forth, causes the output voltage (across the terminals of variable resistor 80) to vary from 0 to 1.5 volts in direct proportion.

It will therefore be seen that as the slider 4 of the transmitting foot potentiometer moves from any one foot position toward another the variation in voltage effected by its movement over this one foot range is offset by an opposing voltage which varies in the same manner and to the same extent, whereby the pointer 12 of the receiving foot potentiometer will remain stationary at said one foot position on scale 14. The pointer 12 will not move until the opposing voltage ceases which happens when the slider 7 of the receiving inch potentiometer resets to zero. Then, the one foot change in voltage built up by movement of the transmitting foot potentiometer through a one foot range will cause the motor $M^2$ to move pointer 12 up or down as the case may be to the next one foot graduation on scale 14 and the slider 8 to rebalance the network.

The invention, as thus far described, is applicable for the remote indications of liquid level in a single tank. However, when a plurality of tanks are employed and the receiver is switched from one transmitter to the other, as for example by the switch S, there is a possibility of error under certain conditions unless means are provided to prevent. The difficulty arises from the necessity of using a continuously rotatable inch potentiometer 1, where the slider 3 must move from one end of the potentiometer winding to the other across a dead spot or gap 63. This gap represents about half of one per cent of the winding space of the potentiometer and usually about 1/16″ on the scale 13. This will mean a variation of 1/32″ at the zero point, which is not too serious. The serious factor is that about half of one per cent of the time or about once in 200 times, the slider 3 will stop in gap 63, thereby opening the null-balance circuit and making it inoperative.

In the case of a single tank system, the inch indicator 11 will follow down with the tank level to within 1/32 inch of zero level and remain there in an inoperative condition until the tank level changes sufficiently to cause the slider 3 of the transmitting inch potentiometer to remake contact with either the top or the botom of its resistance winding and thus no serious error will occur. However, in a multi-tank system, trouble can arise, when the operator switches the pair of receivers from one pair of transmitters, as at $T^1$, to another pair of transmitters as at $T^2$. Suppose that the first tank has a level of 25 feet 6¾ inches and that this level has been read and recorded. Suppose also that the second tank has a level of 41 feet 0 inches and that the slider 3 of its inch potentiometer is on the dead spot 63. When the operator switches to the second tank, the foot indicator 12 will attempt to rebalance to the proper foot graduation on scale 14 but the inch pointer 11 will remain in error at the 6¾″ reading. Moreover, the stepping signal, which was correct for the first tank, or of the proper amplitude for an inch reading of 6¾″, is now incorrectly applied to the foot indicator 12 and will position it about midway between the 40 foot and 41 foot positions on scale 14.

To overcome this difficulty, a relatively-small 60 cycle alternating-current signal, which I call a "creep" signal, is injected into the amplifier in such a manner as to actuate the motor $M^1$ in the direction necessary to turn the indicator 11 back to zero, whenever the measuring circuit network is opened because of the slider 3 stopping in the gap 63. While this creep signal may be injected into the amplifier $A^1$ at various locations, it is herein shown as injected into the cathode circuit of the first stage amplifier tube 85. This creep signal is derived from a secondary 82 of transformer 25 that supplies the 6 volts needed for the heaters of the various tubes. One terminal of such secondary is customarily grounded and the other terminal is connected by a wire 83 and a 150,000 ohm resistor 84 to the cathode terminal of the first stage tube 85 of amplifier $A^1$. This tube has an input resistor 86 (in this example having a resistance of 1 megohm) and a cathode bias resistor 87 (in this example having a resistance of 3300 ohms). The resistors 84 and 87 constitute a voltage divider and the voltage across the terminals of resistor 87 will be about .129 A. C. volts in this example. This creep signal is applied to the cathode circuit of tube 85, and assuming an amplification of 10 in the first stage of the amplifier, this signal would be balanced by an input signal of .0129 A. C. volts in the direction tending to turn the motor $M^1$ to move the indicator away from zero. This creep signal, in this example, is amplified about 150 times, and provides at the motor $M^1$ about 19 volts, which is sufficiently above the average motor starting voltage of around 8 volts, to accomplish the purpose. The polarity or phase of this alternating creep voltage is such as to turn the motor in the direction necessary to move the indicator 11 back to zero. A stop, indicated conventionally at 88, is provided to arrest indicator 11 at zero. Similar stops 89 are provided to prevent the slider 7 from running off either end of the resistance winding of potentiometer 5. Consequently, under the circumstances above described, where the receivers are switched from the transmitters at one tank which has a level of 25 feet 6¾ inches, to the transmitters at another tank, which has a level of 41 feet 0 inches, the transmitter inch potentiometer will be open because its slider 3 is in gap 63 and the creep signal will cause the pointer 11 to move back to zero position. As the slider 7 of the inch potentiometer 5 resets to zero, the stepping signal will decrease to zero and be canceled. The slider 8 of the receiving foot potentiometer will rebalance at the 41 foot position and indicator 8 will be moved to the 41 foot indication on scale 14.

The use of the creep signal necessarily means that balancing of the measuring circuit will occur when the indicator 11 is at a point slightly offset from zero, assuming that this circuit has been reclosed. This offset will, however, always be in the same direction and by the same amount. Compensation may be made by shifting the scale by the amount of the offset or by adjustment of the line resistors 19 and 20. Since balance takes place, strictly speaking, at a false null point, it is necessary that a very minute line current flow, just sufficient to produce an output voltage from the converter bridge circuit of equal amplitude and opposite phase to overcome the injected creep signal. The error introduced by the use of this creep signal is well within the permissible tolerance and represents a difference in level of only .002 inch.

In operation, assuming switch S to be positioned as shown, the transmitters at $T^1$ are coupled to the receivers at $R^1$ and any variation in the condition being measured, such as level of liquid in a storage tank, will cause movement of the units and fractions sliders 4 and 3, respectively. The movement of the fractions slider 3 unbalances the fractions measuring circuit network and causes the motor $M^1$ to be actuated to move slider 7 of the fractions receiving potentiometer 5 to rebalance the network and also move indicator 11 to indicate on scale 13 the new level in fractions, in this case inches. The movement of the slider 4 of the units or foot potentiometer 2 does not, however, cause the slider 8 of the units receiving potentiometer 6 to follow it. As the foot slider 4 moves and effects a change in voltage, an equal but opposite voltage is created by the stepping means ST, with the result that the slider 8 remains stationary and the indicator 12 likewise remains stationary at a unit or foot graduation on scale 14. The stepping means ST is controlled by the movement of the slider 7 of the fractions or inch receiving potentiometer 5. The fractions indicator 11 will move up or down the scale 13 without any resulting movement of the units indicator 12 until the slider 3 of the fractions transmitting potentiometer moves from one end of the winding of the latter to the other end. When this occurs, the slider 7 will rebalance and reset indicator 11 from zero to full scale (12 inch) position or vice versa. In either case, the bucking signal will be caused to drop to zero, whereupon the units sliders 8 will rebalance and move the indicator 12 to a position one unit higher or lower on the scale 14.

In switching the receivers from one pair of transmitters to another pair, the creep signal comes into play, whenever the slider 3 of the fractions potentiometer of the second transmitter is in the gap 63. The measuring circuit is then broken preventing the fractions receiving potentiometer from rebalancing and its indicator from showing the proper value. On such a break in the measuring circuit and in the event that the slider 7 and indicator 11 are in other than their zero positions, the motor $M^1$ will be actuated to move them to such positions.

The invention thus provides an improved telemetric system which is particularly adapted for use where the measuring instruments must show units and fractions of the condition being measured. It is characterized by improved means for maintaining the units indicator stationary at one unit position during the movement of the fractions indicator between the two extreme positions of its range and for moving the units indicator by one unit increments only when the fractions indicator reaches either of its extreme positions. The invention also is characterized by means for moving the fractions indicator to its zero position, whenever, on switching from one fractions transmitter to another, the slider of the latter transmitter is on its dead spot whereby the measuring network is temporarily inoperative. The invention is particularly useful in systems where there are a plurality of transmitters that are to be successively connected to a single receiver and enables the switching from one transmitter to another to be effected without introducing any possibility of any substantial error occurring.

What is claimed is:

1. In a telemetric system, first and second transmitters adapted on variations in the condition being measured to produce direct current voltage variations which are proportionate to the variations of said condition but at two different rates, first and second receivers respectively having first and second movable indicators adapted to be respectively moved over relatively small and large ranges by a variation of one unit in the condition being measured, first and second electrical circuits respectively coupling the first and second transmitters to the first and second receivers for transmitting said voltage variations, said first and second indicators being actuated by the voltage variations produced in the first and second transmitters to respectively show in units and fractions of a unit the variations in the condition being measured; said second indicator, when moved into one extreme position showing one full unit, being then moved back and reset to its other extreme position showing zero; means for producing in said first circuit a voltage opposing the voltage derived from the first transmitter, and means controlled by the movement of the second indicator between said extreme positions for varying said opposing voltage at the same rate as the voltage derived from the first transmitter, whereby the first indicator remains stationary while the second indicator is moving between said extreme positions and is moved in one step by one full unit by the voltage derived from the first transmitter when the second indicator resets to zero and thereby reduces the opposing voltage to zero, said means for producing an opposing voltage in the first circuit including a transformer having a primary adapted for connection to a source of alternating current and a secondary, a resistor, a rectifier, and a circuit including said secondary, rectifier and resistor, the later also being connected in said first circuit, said rectifier enabling current derived from said secondary to flow through said resistor only in a direction that is opposed to that in which current derived from the first transmitter flows.

2. The combination as claimed in claim 1, in which the means controlled by movement of the second indicator includes a triode, a cathode resistor, a second transformer having a primary adapted for connection to a source of alternating current and a secondary; a series circuit including the plate and cathode of the triode, the secondary of the second transformer and the primary of the first transformer, and a connection between the second transmitter and the grid of said triode.

3. In a telemetric system, first and second transmitting potentiometers, first and second receiving potentiometers, first and second circuits respectively connecting the first transmitting and first receiving potentiometers in parallel and the second transmitting and second receiving potentiometers in parallel, both circuits adapted for connection to a source of direct current, the second transmitting potentiometer having a circular resistance with the ends thereof separated by a small gap, each potentiometer having a movable contact and the contact of the second transmitting potentiometer being rotatable relatively to its resistance and from one end thereof to the other across said gap, the movable contacts of the first and second transmitting potentiometers adapted to be respectively moved over a relatively small and a relatively large range by a variation of one unit in the condition being measured, first and second electrical means for respectively moving the movable contacts of the first and second receiving potentiometers and having first and second input portions respectively, a first series circuit including the movable contacts of the first transmitting and the first receiving potentiometers and the first input portion, a second series circuit including the movable contacts of the second transmitting and the second receiving potentiometers and the second input portion, first and second measuring instruments having movable members for respectively showing units and fractions of a unit of the condition being measured and respectively actuated by the movable contacts of the first and second receiving potentiometers, a third electrical means for producing in said first series circuit a direct current voltage opposing the voltage derived from the first transmitting potentiometer, and a fourth electrical means controlling the third electrical means by the movement of the movable contact of one of the second potentiometers and maintaining the opposing voltage equal to that derived from the first transmitting potentiometer, whereby the movable member of the units measuring instrument remains stationary until the movable contact of the second transmitting potentiometer moves from one end to the other of the resistance of the latter and thereby causes resetting of the second indicator and reduction of the opposing voltage to zero, whereby the movable member of the units measuring instrument is then moved in one step by one unit by the voltage derived from the first transmitting potentiometer, said third electrical means including a transformer having a primary adapted for connection to a source of alternating current and a secondary, a resistor, a rectifier and a circuit including in series the secondary, rectifier and resistor; the latter also being connected in said first series circuit with the movable contacts to the two first potentiometers and with said first input portion, said rectifier enabling current derived from said secondary to flow through said resistor only in a direction that is opposed to that in which the current derived by movement of the movable contact of the first transmitting potentiometer flows.

4. The combination, as claimed in claim 3, in which a capacitor is connected in parallel with said resistor on the output side of the rectifier.

5. The combination, as claimed in claim 3, in which the fourth electrical means includes a triode, a cathode resistor, a second transformer having a primary adapted for connection to a source of alternating current and a secondary, a series circuit including the plate and cathode of the triode, the secondary of the second transformer and the primary of the first transformer, and a connection between the movable contact of one of the second potentiometers to the grid of the triode.

6. The combination, as claimed in claim 5, in which the connection to the grid of the triode connects with the movable contact of the second receiving potentiometer.

7. In a telemetric system, a plurality of transmitting potentiometers each including a circular resistance, the ends of which are separated by a small gap and adapted for connection to a source of direct current, and a contact which is rotatable over the resistance and from one end thereof to the other across said gap; a receiving potentiometer including a resistance and a contact movable along the resistance between the ends thereof, electrical means for moving the last-named contact in either direction along the last-named resistance, a switch for selectively connecting the receiving potentiometer to the transmitting potentiometers, circuit connections one between each transmitting potentiometer contact and said switch, and a circuit connection between said switch and said electrical means and the contact of the receiving potentiometer, whereby the contact of the receiving potentiometer will be moved by said electrical means by the unbalance voltages of the transmitting potentiometer to which it is connected, an indicator driven by said electrical means between zero and maximum extreme positions, and means for producing in the last-named circuit connection a constant and relatively small voltage tending to actuate said electrical means in a direction such as to reset said indicator to zero, whereby when said switch is actuated to connect the receiving potentiometer to another transmitting potentiometer and the contact of the latter potentiometer is positioned in the gap between the ends of its resistance, the indicator if in other than zero position will be turned to such position by said constant small voltage.

8. The combination as claimed in claim 7, in which said electrical means includes a reversible alternating-current servo-motor for moving the contact of the receiving potentiometer and said indicator, means connected in series in the second-named circuit connection for converting the unidirectional unbalance voltages into phase-sensitive alternating-current signals, and an amplifier having its input terminals connected to said converting means and its output terminals connected to said servo-motor, whereby the latter is actuated by the amplified alternating-current signals in one direction or the other depending on the direction of unbalance; and the constant small voltage tending to reset the indicator to zero is produced in the amplifier as a small alternating-current signal in a direction such as to tend to actuate the servo-motor to turn said indicator back to zero position.

9. In a telemetric system, a transmitter and a receiver connected in a normally balanced circuit network, a supply source of unidirectional current for said network, the latter becoming unbalanced by voltage variations produced by variations in the condition being measured; said receiver including a member movable to rebalance the network and a reversible alternating-current servo-motor for moving said member; a measuring instrument, having an indicator movable by said motor between zero and maximum extreme positions; means for converting the unidirectional unbalance voltages into phase-sensitive alternating-current signals, an amplifier having its input terminals connected to said converting means and its output terminals connected to said servo-motor, whereby the latter is actuated by the amplified alternating-current signals in one direction or the other depending on the direction of unbalance, and means for producing in the amplifier a constant and relatively small alternating-current signal in a direction such as to tend to actuate the servo-motor to turn said indicator back to zero position, whereby on interruption of the circuit network the indicator and said movable member will be turned back to zero position by the servo-motor actuated by said constant signal.

References Cited in the file of this patent

UNITED STATES PATENTS

| | | |
|---|---|---|
| 1,964,228 | Tanner | June 26, 1934 |
| 2,443,623 | Koenig | June 22, 1948 |
| 2,498,306 | Stedman et al. | Feb. 21, 1950 |
| 2,631,778 | Piper et al. | Mar. 17, 1953 |

FOREIGN PATENTS

| | | |
|---|---|---|
| 657,031 | Great Britain | Sept. 12, 1951 |